(12) United States Patent
Bramauer et al.

(10) Patent No.: US 12,185,203 B2
(45) Date of Patent: Dec. 31, 2024

(54) METHOD AND DEVICE FOR CHECKING A BOARDING SYSTEM FOR A VEHICLE

(71) Applicant: KNORR-BREMSE GESELLSCHAFT MIT BESCHRÄNKTER HAFTUNG, Mödling (AT)

(72) Inventors: Johann Bramauer, Ybbsitz (AT); Reinhard Ekker, Scheibbs (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 0 days.

(21) Appl. No.: 17/797,714

(22) PCT Filed: Feb. 1, 2021

(86) PCT No.: PCT/EP2021/052321
§ 371 (c)(1),
(2) Date: Aug. 4, 2022

(87) PCT Pub. No.: WO2021/156209
PCT Pub. Date: Aug. 12, 2021

(65) Prior Publication Data
US 2023/0104533 A1 Apr. 6, 2023

(30) Foreign Application Priority Data
Feb. 4, 2020 (EP) .................................. 20155316

(51) Int. Cl.
*H04W 4/42* (2018.01)
*H04L 43/045* (2022.01)
*H04L 43/06* (2022.01)

(52) U.S. Cl.
CPC ............. *H04W 4/42* (2018.02); *H04L 43/045* (2013.01); *H04L 43/06* (2013.01)

(58) Field of Classification Search
CPC ......... H04W 4/42; H04L 43/045; H04L 43/06
(Continued)

(56) References Cited

U.S. PATENT DOCUMENTS 6,728,612 B1 * 4/2004 Carver .................... H04L 43/50
701/34.3
8,571,751 B1 10/2013 Blair
(Continued)

FOREIGN PATENT DOCUMENTS

CN 106525468 A * 3/2017 ............ G01M 17/08
KR 20110017195 A * 2/2011
(Continued)

OTHER PUBLICATIONS

International Search Report and Written Opinion corresponding to PCT/EP2021/052321 dated Mar. 26, 2021.
(Continued)

*Primary Examiner* — James E Springer
(74) *Attorney, Agent, or Firm* — Barnes & Thornburg LLP

(57) ABSTRACT

A method for checking a boarding system for a vehicle includes receiving and/or reading-in and generating, wherein the receiving, a data signal may be received via an interface to a database, the data signal representing at least one boarding system value of the boarding system stored in the database, wherein in the reading-in, an input signal, which represents a checking value of a checking operation of the boarding system manually input on an input device, may be read in, and the generating generates an electronic checking log using the input signal and/or data signal.

21 Claims, 6 Drawing Sheets

(58) Field of Classification Search
USPC .......................................................... 709/224
See application file for complete search history.

(56)     References Cited

U.S. PATENT DOCUMENTS

| | | | |
|---|---|---|---|
| 2018/0195967 A1* | 7/2018 | Son | G01N 35/00603 |
| 2020/0139841 A1* | 5/2020 | Ono | B60L 50/16 |
| 2021/0086784 A1* | 3/2021 | Stewart | G05D 1/0297 |

FOREIGN PATENT DOCUMENTS

| KR | 20110126355 A | * | 11/2011 |
|---|---|---|---|
| KR | 101962292 B1 | | 7/2019 |

OTHER PUBLICATIONS

Chinese Office Action corresponding to CN202180012719.5 dated Sep. 26, 2024.

* cited by examiner

METHOD AND DEVICE FOR CHECKING A BOARDING SYSTEM FOR A VEHICLE

CROSS REFERENCE AND PRIORITY CLAIM

This patent application is a U.S. National Phase of International Patent Application No. PCT/EP2021/052321 filed Feb. 1, 2021, which claims priority to European Patent Application No. 20155316.1, the disclosure of which being incorporated herein by reference in their entireties.

FIELD

The present approach relates to a method and an apparatus for testing a boarding system for a vehicle.

BACKGROUND

Conventionally, test sequences for boarding systems are completed using predefined paper checklists.

SUMMARY

Against this background, disclosed embodiments provide an improved method for testing a boarding system for a vehicle and an improved apparatus for testing a boarding system for a vehicle.

BRIEF DESCRIPTION OF THE FIGURES

Exemplary embodiments of the approach presented here are explained more thoroughly in the description that follows and with reference to the figures, in which.

Figure 1:
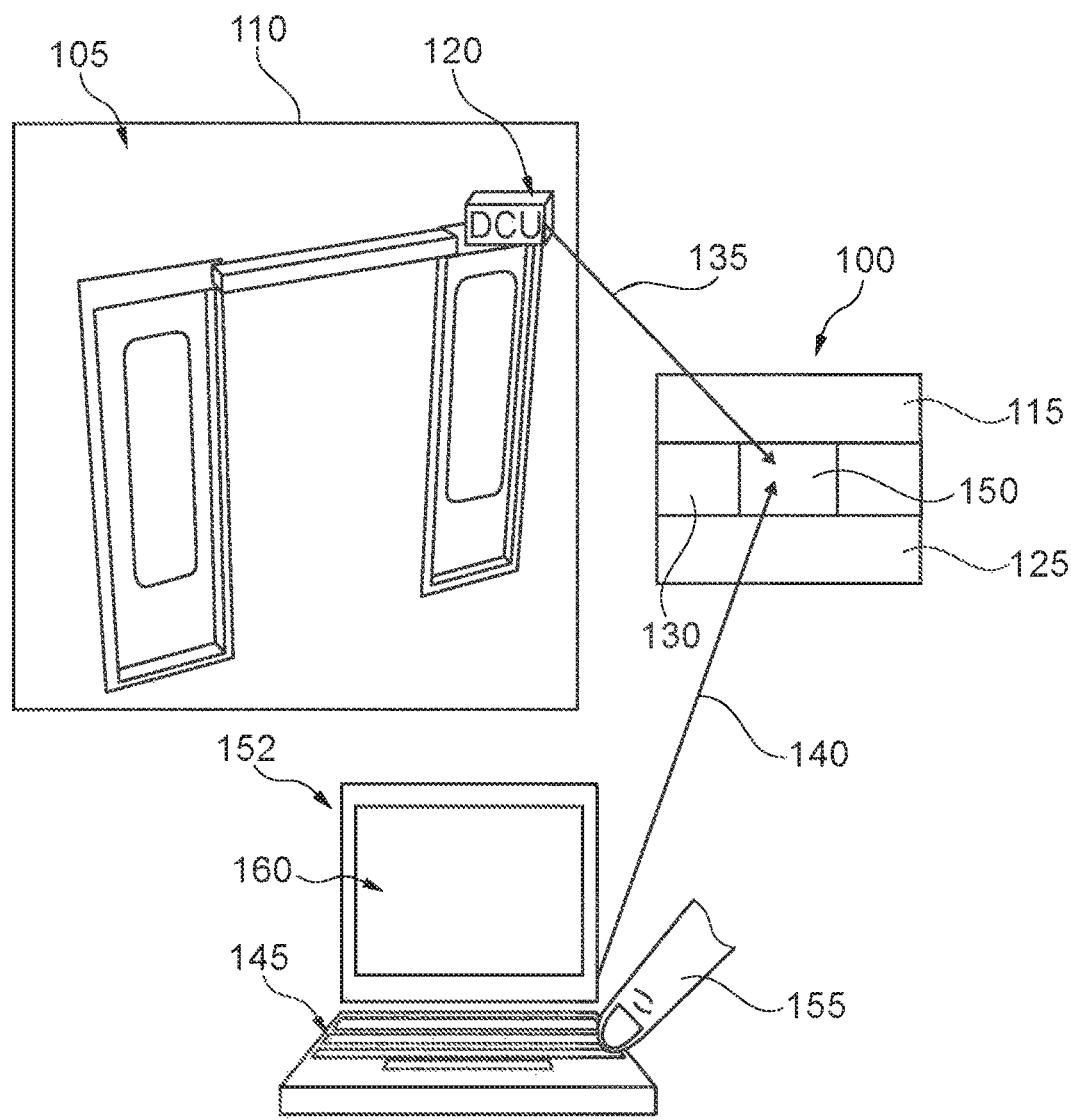
FIG. 1 shows a schematic representation of an apparatus for testing a boarding system for a vehicle according to an exemplary embodiment.

In the description that follows, identical or similar reference signs are used for the similarly acting elements shown in the various figures, a repeat description of these elements being dispensed with.

DETAILED DESCRIPTION

Disclosed embodiments provide an improved method for testing a boarding system for a vehicle and an improved apparatus for testing a boarding system for a vehicle, wherein an automated test method is provided.

Disclosed embodiments provide a method for testing a boarding system for a vehicle that includes a receiving operation, additionally or alternatively a reading-in operation, and a generation operation. The receiving operation comprises receiving a data signal via an interface to a database, the data signal representing at least one boarding system value of the boarding system that may be recorded in the database. The reading-in operation comprises reading in an input signal that represents a manually input test value for a test operation for the boarding system on an input device. The generation operation comprises generating an electronic test log by using the input signal and additionally or alternatively data signal.

This method may be implemented for example in software or hardware or in a hybrid form comprising software and hardware, for example in a control unit.

The boarding system may be a door system that can be electronically opened and additionally or alternatively electronically closed. The boarding system may be used by persons to board and alight from the vehicle, which may be a rail vehicle, for example. The vehicle may also have several such boarding systems, each of the boarding systems being able to have an individual door control unit. Alternatively or additionally, testing may also involve a check on the function testing not the function of the door itself, but rather that of a footstep. Testing the boarding system requires an inspector to perform various test operations to discover a condition of the boarding system and to be able to initiate any servicing work. These test operations may now be performed in digitized form owing to the method presented here. The database may be for example a device in the door control unit or else in the cloud, from which the recorded boarding system value may be read to save an additional manual test operation. The receiving operation may accordingly comprise receiving the data signal via an interface to at least one door control unit of the boarding system. The reading-in operation may comprise reading in the input signal, the test value having been input on an input device of a mobile tester. A mobile tester or mobile device in general is intended to be understood below to mean a manually portable device, for example a laptop, notebook or smartphone. This provides the inspector with a mobile way of performing the manual test operations. The input device may be a mechanical or electronic, for example touch-sensitive, key on the mobile tester. The method presented here thus allows automated generation of a test log either by using one or more manually input test values or by using one or more received recorded boarding system values, or by using a combination of manually input test values and received recorded boarding system values. A time for performing a full test run may be very short owing to this method.

The method may further comprise an activation operation in which the receiving operation may be performed in response to an activation signal. The activation signal may be output in response to manual operation of a start button for starting test run software on the mobile tester. Additionally or alternatively, the door control unit may be put into a test mode in response to the activation signal until the test run is complete.

Optionally, the method comprises a further reading-in operation in which a test plan may be read in and additionally or alternatively displayed that comprises a list of test operations to be performed, the receiving operation and additionally or alternatively the reading-in operation being performed on the basis of the test plan. Such a test plan may provide the inspector with orientation about the test operations to be performed. These may be displayed on the mobile tester, for example, and subsequently worked through by the inspector.

The method may also comprise a display operation in which at least one request signal may be output that displays a test operation to be performed to a user on a display device to obtain the input signal. The display operation may also be performed using the test plan. As such, a predefined test run may be carried out sequentially. Using suitable software, for example with an assistant, the test plan may be used to take the inspector through the test operations to be performed and to actively request appropriate input signals in the process.

By way of example, the receiving operation may comprise receiving the data signal by wire, in particular by Ethernet (specifically an Ethernet protocol), and additionally or alternatively wirelessly. Ethernet, or the Ethernet protocol, may be used to quickly and easily resort to an already existing network, for example a train network. Wireless communication, on the other hand, allows particularly great mobility for the inspector and the tester.

The reading-in operation may comprise reading in and additionally or alternatively providing the input signal from a WLAN-compatible mobile device, the mobile device in particular being able to be designed to be attached to a body part. The mobile device may increase a freedom of action for the inspector by being attachable for example to an arm of the inspector, for example in a similar manner to attachment of a watch. Both hands of the inspector may thus remain free to perform manual test operations. The mobile tester described above may additionally be used, for example the mobile tester being able to be used to display an entire test plan and the mobile device being able to be used to display and operate just one test operation that currently needs to be performed.

Optionally, according to one embodiment, the method comprises a storage operation in which the full test log may be stored in a nonvolatile storage device. As such, the full test log may be archived or provided for future evaluation.

The reading-in operation may furthermore comprise reading in an image signal that represents an image of at least one portion of a driver's cab, the generation operation comprising generating the test log by using the image signal. As such, information displayed in the driver's cab during the test run may also be able to be viewed by the inspector outside the driver's cab, for example on the mobile device and additionally or alternatively the mobile tester.

According to a further embodiment, the receiving operation may comprise reading in association information that represents an association between the recorded boarding system value and one of multiple boarding systems to be tested, the generation operation comprising providing the test log by using the association information. Such an embodiment affords technical utility that, if it is not possible to distinguish a test for individual boarding systems, for example doors, then when multiple doors are tested at the same time the testers are able to interact to allow the condition on the vehicle to be associated with the respective door system/test operation.

The approach presented here further provides an apparatus designed to perform, control or implement the operations of a variant of a method presented here in appropriate equipment. This variant embodiment of the approach in the form of an apparatus also allows the object on which the approach may be based to be achieved quickly and efficiently.

In this regard, the apparatus may comprise at least one computing unit for processing signals or data, at least one storage unit for storing signals or data, at least one interface to a sensor or an actuator for reading in sensor signals from the sensor or for outputting data signals or control signals to the actuator and/or at least one communication interface for reading in or outputting data embedded in a communication protocol. The computing unit may be for example a signal processor, a microcontroller or the like, the storage unit being able to be a flash memory, an EPROM or a magnetic storage unit. The communication interface may be designed to read in or output data wirelessly and/or by wire, a communication interface that is able to read in or output wire-based data being able to read in these data from an applicable data transmission line or to output them to an applicable data transmission line electrically or optically, for example.

An apparatus may be understood in the present case to mean an electrical device that processes sensor signals and outputs control and/or data signals on the basis thereof. The apparatus may comprise an interface, which may be in hardware and/or software form. When in hardware form, the interfaces may be part of a so-called system ASIC, for example, which contains a wide variety of functions of the apparatus. However, it may be also possible for the interfaces to be individual, integrated circuits or to consist of discrete components at least in part. When in software form, the interfaces may be software modules that are present on a microcontroller besides other software modules, for example.

In one optional configuration, the apparatus controls a method for testing a boarding system for a vehicle. In this regard, the apparatus may access sensor signals, for example, such as a data signal that represents at least one boarding system value of the boarding system that may be recorded in the database and additionally or alternatively an input signal that represents a manually input test value for a test operation for the boarding system on an input device. The control may be effected by way of actuators such as an interface to the database for receiving the data signal and additionally or alternatively a reading-in device for reading in the input signal and a generating device for generating an electronic test log using the input signal and additionally or alternatively the data signal.

FIG. 1 shows a schematic representation of an apparatus 100 for testing a boarding system 105 for a vehicle 110 according to an exemplary embodiment.

The apparatus 100 has an interface 115 to a database 120 and/or has a reading-in device 125 and a generating device 130. The interface 115 may be designed to receive a data signal 135 that represents at least one boarding system value of the boarding system 105 that may be recorded in the database 120. The reading-in device 125 may be designed to read in an input signal 140 that represents a manually input test value for a test operation for the boarding system 105 on an input device 145. The generating device 130 may be designed to use the input signal 140 and/or the data signal 135 to generate an electronic test log 150.

According to an alternative exemplary embodiment, the boarding system 105 may be any other system having control electronics, the apparatus 100, according to the description above, being designed to test this system. According to this exemplary embodiment, the vehicle 110 may be embodied as a rail vehicle. According to an alternative exemplary embodiment, the vehicle 110 may be a truck or automobile. According to this exemplary embodiment, the boarding system 105 may be a door system that can be electronically opened and/or electronically closed. For this purpose, the boarding system 105 according to this exemplary embodiment has a door control unit DCU that, according to this exemplary embodiment, comprises the database 120. According to one exemplary embodiment, the vehicle 110 has multiple boarding systems 105, each of the boarding systems 105, according to one exemplary embodiment, having an individual such door control unit DCU. According to this exemplary embodiment, the reading-in device 125 may be designed to read in the input signal 140, the test value having been input on the input device 145 of a mobile tester 152. According to this exemplary embodiment, the mobile tester 152 may be designed as a manually portable device in the form of a laptop or notebook. According to an alternative exemplary embodiment, the mobile tester 152 may be designed as a smartphone. According to this exemplary embodiment, the input device 145 may be a computer keyboard having one or more mechanical and/or electronic, for example touch-sensitive, keys that are manually operable by an inspector 155, also called a "user" below, to generate the input signal 140.

According to this exemplary embodiment, the apparatus 100 may be furthermore designed to receive the data signal 135 in response to an activation signal. According to this exemplary embodiment, the activation signal may be output in response to manual operation of a start button for starting test run software on the mobile tester 152. According to this exemplary embodiment, the apparatus 100 may be designed to put the door control unit DCU into a test mode in response to the activation signal until a test run is complete.

According to this exemplary embodiment, the reading-in device 125 may be furthermore designed to read in and/or display a test plan that comprises a list of test operations to be performed, the interface 115 being designed to receive the data signal 135 on the basis of the test plan and/or the reading-in device 125 being designed to read in the input signal 140 on the basis of the test plan. According to one exemplary embodiment, the test plan may be displayed on a display device 160 of the mobile tester 152.

According to this exemplary embodiment, the apparatus 100 may be designed to use the test plan to output a request signal that displays a test operation to be performed to the user on the display device 160 or a further display device to obtain the input signal 140.

According to this exemplary embodiment, the interface 115 may be designed to receive the data signal 135 by wire, in particular by Ethernet, or an Ethernet protocol, and/or wirelessly, for example, by WLAN.

According to this exemplary embodiment, the apparatus 100 may be furthermore designed to store the full test log 150 in a nonvolatile storage device. The full test log 150 is intended to be understood to mean a finished test log 150 after the test run has been performed in full, for example after all of the test operations of the test plan have been worked through.

According to one exemplary embodiment, the apparatus 100 as a whole or, according to another exemplary embodiment, individual devices 115, 125, 130 of the apparatus 100 is/are arranged or implemented in any arrangement in the mobile tester 152 and/or a so-called back office, for example in a data analysis device, for example on a server.

The apparatus 100 presented here may be used to predict a condition of a system, here the boarding system 105, or of a component. A test method for such prediction may be also referred to as condition-based maintenance, CBM for short, or predictive maintenance and, according to this exemplary embodiment, describes performance of checks/wear measurements on boarding systems 105. A method that can be performed by the apparatus 100 may also be referred to as a "test-runner-software-supported test run with data capture".

The apparatus 100 makes it possible to avoid test sequences by predefined paper checklists and thus to gain control over correct performance of relevant test points. The electronic test log 150 generated by the apparatus 100 may be archived over the life of the system 105 very easily in comparison with a paper checklist by storing it, and the test log 150 is furthermore quick and easy to retrieve again or to process further. It is likewise easy to adapt the test plan on which the test log 150 may be based. Individual test points/operations and/or wear measurements as part of the checks furthermore do not necessarily need to be performed manually if the information required therefor may be available in full in the door controller DCU. Such information may be received from the interface 115 quickly and easily as data signals 135. This results in the test sequences taking only a very short time. That is to say that, in summary, the apparatus 100 makes it possible to provide a method for semi-/automatic performance of defined test sequences.

According to this exemplary embodiment, a software module may be provided within a control unit, here within the door control unit DCU, the software module being designed to provide the boarding system values, which may be any recorded information concerning the system, here the boarding system 105, for the apparatus 100. According to one exemplary embodiment, this software module may be likewise part of the apparatus 100. Furthermore, standalone software, here the interface 115 of the apparatus 100, may be provided on a device that may be independent of the control unit, which device, according to this exemplary embodiment, may be designed as the mobile tester 152 in the form of the laptop, smartphone, a tablet or VR/AR goggles. The mobile tester 152 may be also referred to as "independent device" below. A connection may be made between the control unit and the independent device in this instance.

According to one exemplary embodiment, the software on the independent device performs the test sequence previously defined in the test plan; according to one exemplary embodiment, the facility of being able to communicate with the control unit may be used to read all the information available in the control unit. Individual test points of the test sequence are thus executed fully automatically; for other test points/measurements requiring manual intervention, a result registered in a controller may be read automatically. Purely manual test points for whose performance there may be no information at all within the controller may be confirmed by the inspector 155 within the test software on the independent device.

There now follows the description of an exemplary application of the apparatus 100 presented here:

According to one exemplary embodiment, the mobile tester 152 may be connected to the door control units DCU by a network, for example a train network, for example, by Ethernet, or an Ethernet protocol. According to one exemplary embodiment, the test run software may be started on the mobile tester 152 and the boarding system 105 to be checked may be selected, for example manually by the inspector 155. According to one exemplary embodiment, the individual test points and the work operations required therefor are presented to the user on the display device 160 on the mobile tester 152 and/or on a further display device; in this regard see also FIGS. 2, 3 and 4. According to one exemplary embodiment, the software takes the user through the test sequence and either automatically documents the results of each test point, if the information required therefor may be available in the connected control unit, or prompts the user to input the required information manually. When the test sequence has concluded, the software provides the user with the electronic test log 150, which may be archived according to one exemplary embodiment.

To increase the user friendliness of the test sequence, multiple independent devices are also combined according to one exemplary embodiment, for example a notebook that communicates with the control unit and displays all the available information, and, according to one exemplary embodiment, additionally a smartphone that displays only the most necessary information, for example, but permits hands-free usage, that may be to say permits the inspector 155 to have his hands free. Technical utility of the apparatus 100 presented here include the provision of a digital test method for boarding systems 105, the communication with the control unit of the system 105 to be checked to read available information, and the ability of the test sequences to be performed in the best possible time. As such, a time reduction may be produced as a result of the communication with the control unit and thus some manual test points are dispensed with, all test points are performed securely as a result of the software-supported process, and the archiving and further processing of the test logs 150 are facilitated, since these are available electronically according to one exemplary embodiment.

Figure 2:
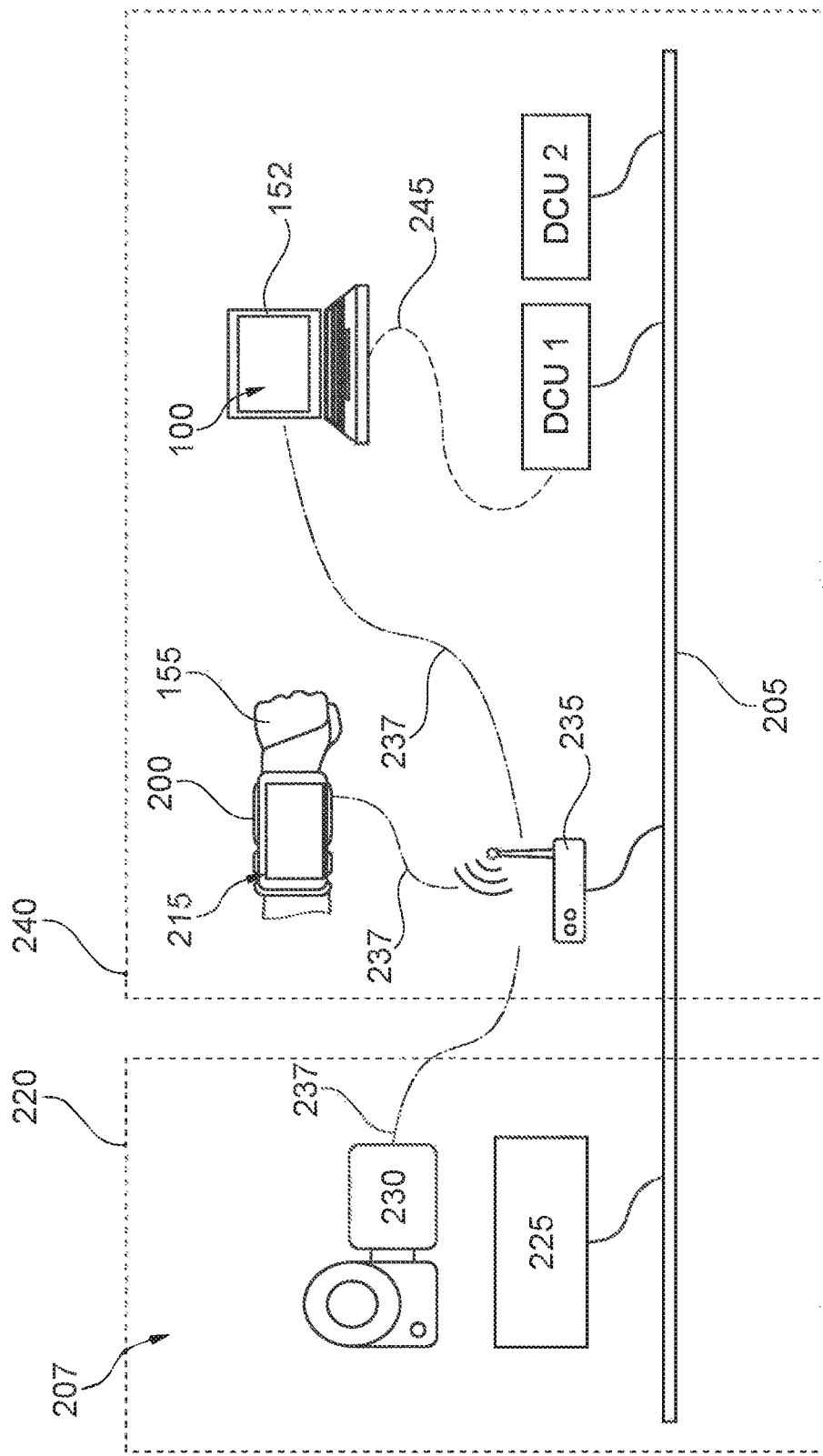
FIG. 2 shows a schematic representation of an apparatus according to an exemplary embodiment.

FIG. 2 shows a schematic representation of an apparatus 100 according to an exemplary embodiment. This may be the apparatus 100 described in FIG. 1. A hands-free usage design implementable by the apparatus 100, including communication paths, is shown.

According to this exemplary embodiment, the reading-in device of the apparatus 100 may be furthermore designed to read in and/or provide the input signal from a WLAN-compatible mobile device 200, the mobile device 200 according to this exemplary embodiment being designed to be attached to a body part. According to one exemplary embodiment, the mobile tester 152 may be additionally used, wherein, according to one exemplary embodiment, the mobile tester 152 may be used to display an entire test plan and the mobile device 200 may be used to display and/or may be used to operate just one test operation that currently needs to be performed.

According to this exemplary embodiment, the mobile tester 152, which may be designed as a notebook here merely by way of illustration, may be connected to the door control unit DCU 1 by a train network 205 of the rail vehicle 207. According to this exemplary embodiment, at least one further door control unit DCU 2 for a further boarding system of the rail vehicle 207 may be connected to the train network 205. According to this exemplary embodiment, the train network 205 also provides a WLAN, by which the mobile device 200, according to one exemplary embodiment in the form of a smartphone, may be connected. The smartphone may be arranged in a manner attached to the lower arm of the inspector 155 to allow better usability. The notebook may be used to start the test run software and to select the applicable controller. The user sees brief instructions for the respective test point on the further display device, called the screen 215 here, of the smartphone and may be able to confirm correct performance of the instructions and/or, if called for, also to input information or to capture information by components available on the independent device, such as audio, video and/or photographic recording. The software takes the inspector 155 through the test sequence test point by test point and either automatically captures the results from the door control unit DCU 1 or prompts the inspector 155 to add the result manually. When the test sequence has concluded, the software provides the test log in electronic form. During the performance of a test sequence, the door control unit DCU 1 may be in a test mode defined specifically therefor.

According to this exemplary embodiment, the reading-in device of the apparatus 100 may be furthermore designed to read in an image signal that represents an image of at least one portion of a driver's cab 220 of the rail vehicle 207, the generating device being designed to generate the test log by using the image signal. In this case, the reading-in device may be designed to read in the image signal from a camera 230, here in the form of a WiFi-compatible "IP Cam", pointing at a monitor 225 in the driver's cab 220. The camera 230 may be furthermore used to capture a condition on the vehicle that may be triggered by the door. Alternatively, this condition may also be made available to the door controller via the train network 205 (for example TCMS) and then written to the database by the door controller. According to this exemplary embodiment, the monitor 225 may be connected to the train network 207 and designed for so-called "green loop monitoring". A condition in which the condition may be formed for all doors in total and indicates "all doors are closed" may be referred to as a green loop. Since it may be not possible to distinguish this for individual doors, when multiple doors are tested at the same time the testers should interact to allow the condition on the vehicle to be associated with the respective door system/test operation.

According to this exemplary embodiment, a mobile router 235 for providing WiFi 237 may be included in or on a wagon 240 of the rail vehicle 207 and/or connected to the rail network 205. According to this exemplary embodiment, the mobile tester 152 may be connected to the mobile device 200 and/or to the camera 230 by WiFi 237. According to this exemplary embodiment, the notebook may be optionally connected to the door control unit DCU 1 by an RS232 cable 245.

Figure 3:
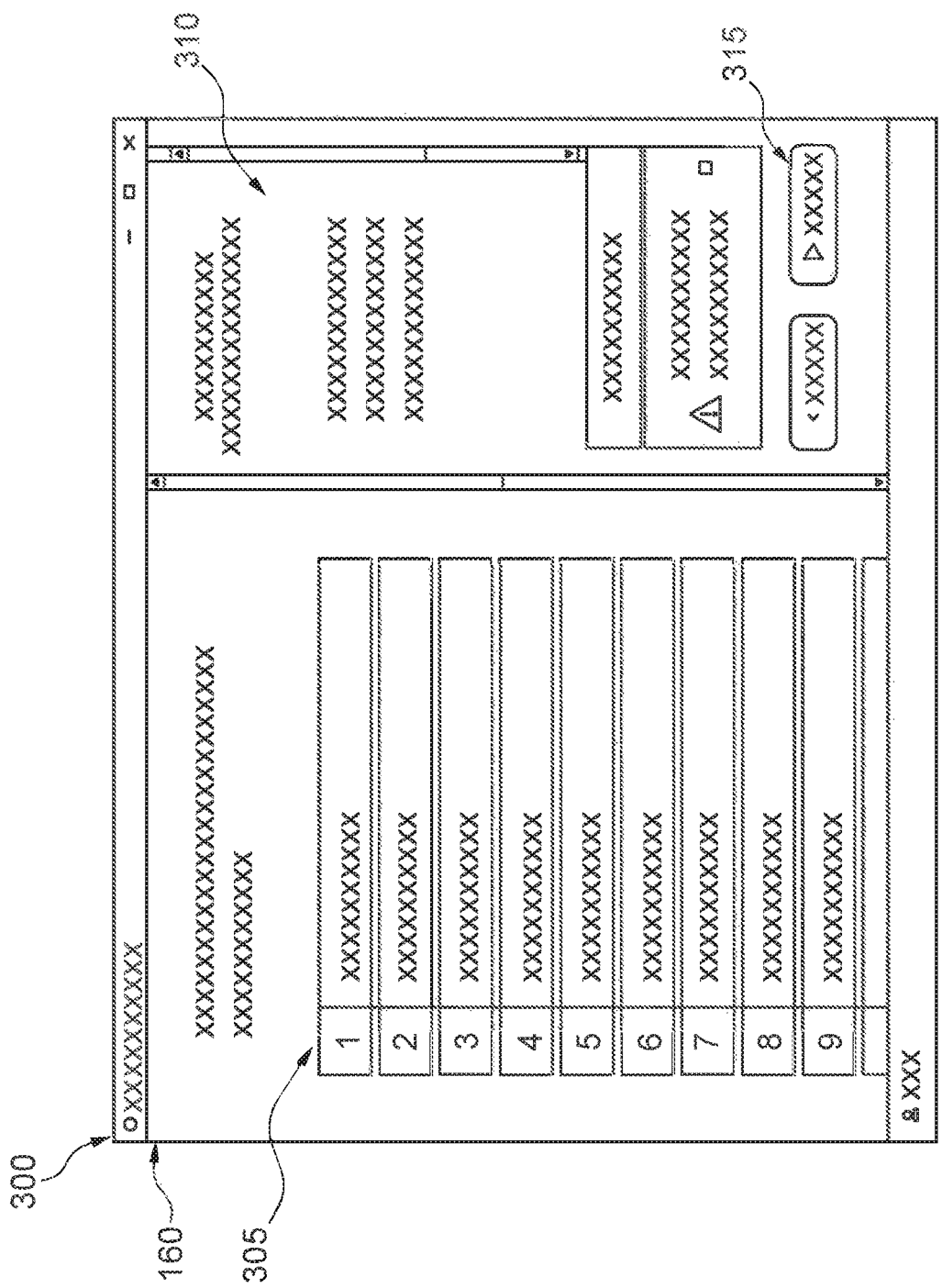
FIG. 3 shows a schematic representation of a test plan of an apparatus according to an exemplary embodiment.

FIG. 3 shows a schematic representation of a test plan 300 of an apparatus according to an exemplary embodiment. This may be the test plan 300 described in FIG. 1 or 2. The test plan 300 may be shown as a user interface, also called "interface", for the inspector. In the representation shown here, the test plan 300 may be displayable on the display device 160 of the mobile tester or on the screen of the mobile device.

According to this exemplary embodiment, the test plan 300 shows a number, list and/or name of test operations 305 to be performed, safety instructions 310 and/or control keys 315 for starting the test sequence, stopping the test sequence and/or navigating within the test sequence.

Figure 4:
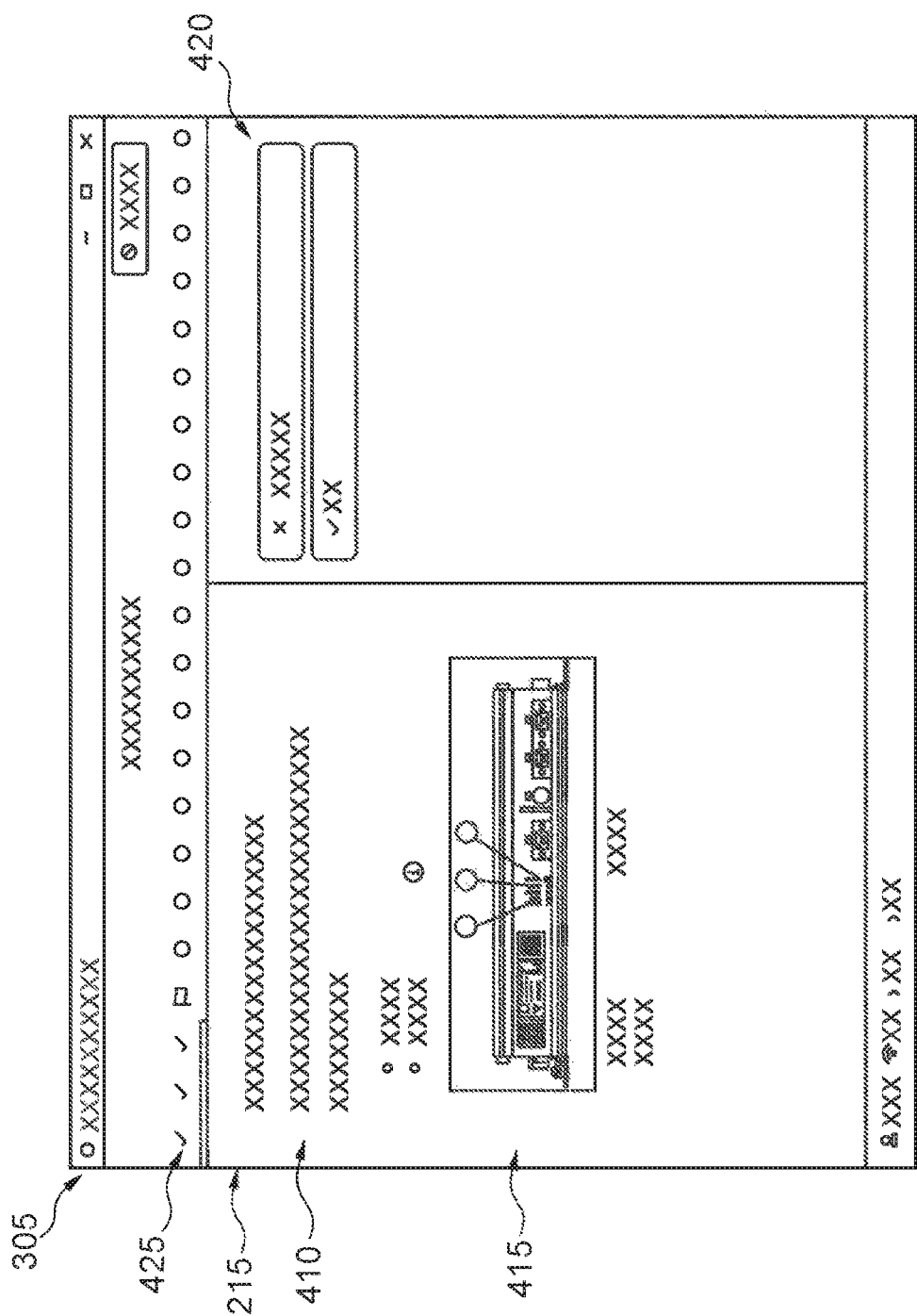
FIG. 4 shows a schematic representation of a test operation of a test plan of an apparatus according to an exemplary embodiment.

FIG. 4 shows a schematic representation of a test operation 305 of a test plan of an apparatus according to an exemplary embodiment. This may be the test plan shown in FIG. 3 or described in one of the preceding figures. In the representation shown here, the test operation 305 may be displayable on the display device of the mobile tester or on the screen 215 of the mobile device.

According to one exemplary embodiment, the test operation 305 may be displayed in response to the request signal described in FIG. 1. According to this exemplary embodiment, the test operation 305 shows a written instruction 410 for an action that may be required, an image 415 to assist the inspector, selection keys 420 for inputting a test result of the test operation 305 and/or an overview 425 of further test operations that have already been performed and/or are yet to be performed.

Figure 5:
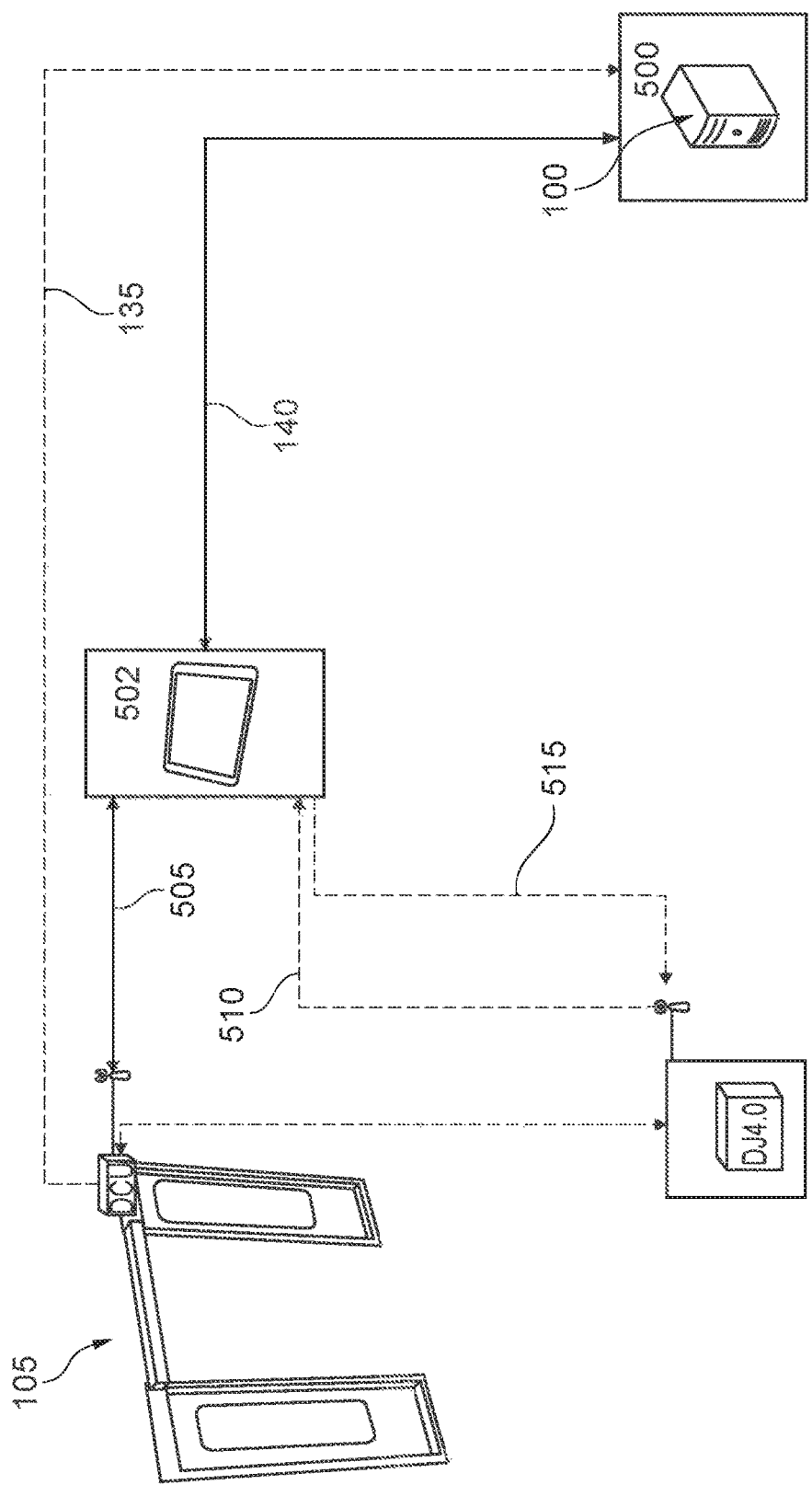
FIG. 5 shows a schematic representation of a design for a software-supported test run using an apparatus according to an exemplary embodiment.

FIG. 5 shows a schematic representation of a design for a software-supported test run using an apparatus 100 according to an exemplary embodiment. The test run may be controllable and/or performable by the apparatus 100 described in one of the preceding figures. According to this exemplary embodiment, at least some devices of the apparatus 100 are included or implemented in the back office 500.

According to this exemplary embodiment, a mobile client 502 in the form of the mobile tester or mobile device may be connected to the door control unit DCU by a hands-free connection 505. According to this exemplary embodiment, the apparatus 100 may be designed to detect availability of a so-called DoorJack DJ and to respond to detection of the DoorJack DJ by activating additional applications (DoorJack package) on the mobile client 502 by a start signal 510. The DoorJack DJ may be designed to perform a simulation of a productive environment and additional measuring functions. Examples of these are: TCMS (train control and management system), Trainline, etc., simulation, signals and/or power supply. The mobile client 502 renders the following applications and controls possible: standard diagnosis/St03A, performance of a safety check, wear test routines and/or setting of CBM parameters on the door control unit DCU. According to this exemplary embodiment, one or more applications of the DoorJack DJ are controllable by the mobile client 502 by way of appropriate actuation signals 515 in response to the start signal 510. If available, data in the form of the data signal 135 are transmitted from the door control unit DCU to the back office 500. According to one exemplary embodiment, the following are retrieved/provided between the mobile client 502 and the back office 500: CBM parameters, a configuration file, setup/installation files, documentation, checklists, test results and/or logs (safety check). The back office 500 may be designed to perform data analysis and provision of additional services; according to one exemplary embodiment, these include indicators and/or remote diagnostics.

Figure 6:
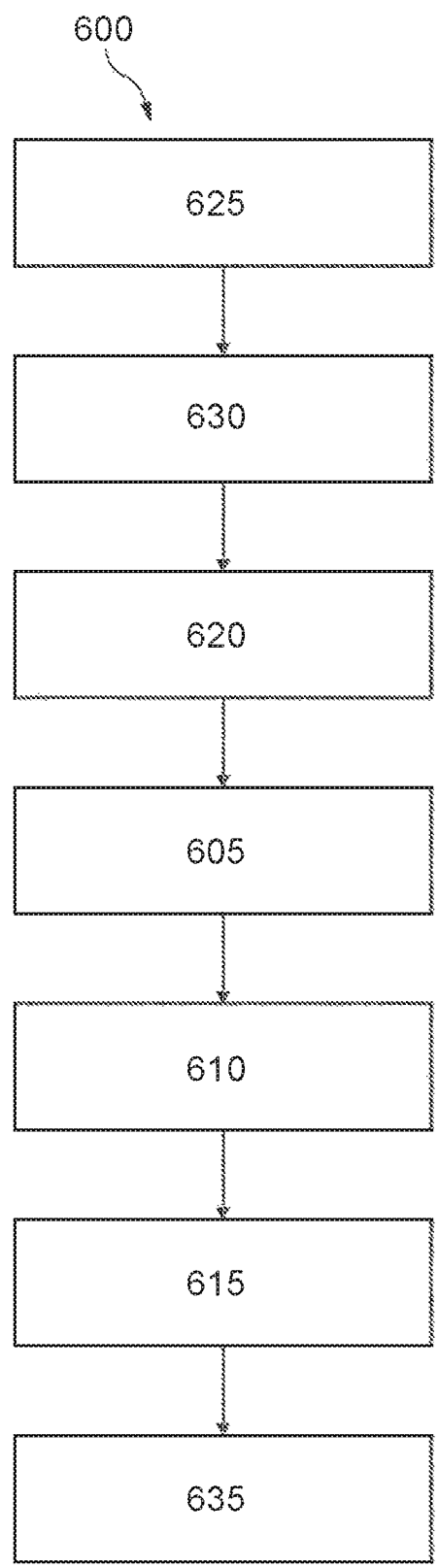
FIG. 6 shows a flowchart for a method for testing a boarding system for a vehicle according to an exemplary embodiment.

FIG. 6 shows a flowchart for a method 600 for testing a boarding system for a vehicle according to an exemplary embodiment. This method 600 may be performable and/or controllable by the apparatus described in one of the preceding figures.

The method 600 comprises a receiving operation 605 and/or a reading-in operation 610 and a generation operation 615. The receiving operation 605 comprises receiving a data signal via an interface to a database, the data signal representing at least one boarding system value of the boarding system that may be recorded in the database. The reading-in operation 610 comprises reading in an input signal that represents a manually input test value for a test operation for the boarding system on an input device. The generation operation 615 comprises generating an electronic test log by using the input signal and/or data signal.

Optionally, according to this exemplary embodiment, the method 600 further comprises an activation operation 620, a further reading-in operation 625, a display operation 630 and/or a storage operation 635.

The activation operation 620 comprises performing the receiving operation 605 in response to an activation signal. The further reading-in operation 625 comprises reading in and/or displaying a test plan comprising a list of test operations to be performed, the receiving operation 605 and/or the reading-in operation 610 being performed on the basis of the test plan. The display operation 630 comprises outputting at least one request signal that displays a test operation to be performed to a user on a display device to obtain the input signal. The storage operation 635 comprises storing the full test log in a nonvolatile storage device.

Furthermore, an exemplary embodiment in which the method 600 comprises, after operation 620, starting in the door controller a routine, or a further operation, that generates the boarding system value, which may then be stored in the database, may be also conceivable.

The method operations presented here may be performed repeatedly and in a different order than that described.

If an exemplary embodiment comprises an "and/or" conjunction between a first feature and a second feature, this should be read as meaning that the exemplary embodiment comprises both the first feature and the second feature according to one embodiment and either just the first feature or just the second feature according to a further embodiment.

LIST OF REFERENCE SIGNS

DCU door control unit
DJ DoorJack
100 apparatus for testing a boarding system for a vehicle
105 boarding system
110 vehicle
115 interface
120 database
125 reading-in device
130 generating device
135 data signal
140 input signal
145 input device
150 test log
152 mobile tester
155 inspector
160 display device
200 mobile device
205 train network
207 rail vehicle
215 screen
220 driver's cab
225 monitor
230 camera
235 router
237 WiFi
240 wagon
245 RS232 cable
300 test plan
305 test operation
310 safety instructions
315 control key
410 instruction
415 image
420 selection key
425 overview
500 back office
502 mobile client
505 hands-free connection
510 start signal
515 actuation signal
600 method for testing a boarding system for a vehicle
605 receiving operation
610 reading-in operation
615 generation operation
620 activation operation
625 further reading-in operation
630 display operation
635 storage operation

The invention claimed is:

1. A method for testing a boarding system for a vehicle, the method comprising:
reading in a test plan and displaying the test plan on a mobile tester, which comprises a list of test operations to be performed, and based on the test plan:

receiving a data signal via an interface to a database, the data signal representing at least one boarding system value of the boarding system that is recorded in the database, and reading in an input signal that represents a manually input test value for a test operation for the boarding system on an input device; and generating an electronic test log using the input signal and data signal, wherein the reading-in operation comprises reading in and/or providing the input signal from a WLAN-compatible mobile device, the mobile device being configured to be attached to a user's body part and to display just one test operation of the test plan at the time the one test operation needs to be performed.

2. The method of claim 1, further comprising an activation operation, wherein the receiving operation is performed in response to an activation signal.

3. The method of claim 2, wherein, after the activation operation, a producing operation is performed to generate a further boarding system value, the further boarding system value then being stored in the database.

4. The method of claim 1, further comprising a display operation in which at least one request signal is output that displays a test to be performed to a user on a display device to obtain the input signal.

5. The method of claim 1, wherein the receiving operation comprises receiving the data signal via an interface to at least one door control unit of the boarding system.

6. The method of claim 1, wherein the receiving operation comprises receiving the data signal by wire and/or wirelessly.

7. The method of claim 1, wherein the reading-in operation comprises reading in the input signal, the test value having been input on an input device of a mobile tester.

8. The method of claim 1, further comprising a storage operation in which a full test log is stored in a nonvolatile storage device.

9. The method of claim 1, wherein the reading-in operation comprises reading in an image signal that represents an image of at least one portion of a driver's cab, and the generation operation comprises generating a test log using the image signal.

10. The method of claim 1, wherein the receiving operation comprises reading in association information that represents an association between the recorded boarding system value and one of multiple boarding systems to be tested, and the generation operation comprises providing the test log by using the association information.

11. The apparatus of claim 1, wherein the receiving includes reading in association information that represents an association between the recorded boarding system value and one of multiple boarding systems to be tested, and the generation operation comprises providing the test log by using the association information.

12. An apparatus configured to perform and/or control a method for testing a boarding system for a vehicle in applicable units, wherein:

a test plan is read in and displayed on a mobile tester that comprises a list of test operations to be performed, and based on the test plan:

a data signal is received via an interface to a database, the data signal representing at least one boarding system value of the boarding system that is recorded in the database, and an input signal that represents a manually input test value for a test operation for the boarding system on an input device is received; and an electronic test log is generated using the input signal and data signal, wherein the reading-in operation comprises reading in and/or providing the input signal from a WLAN-compatible mobile device, the mobile device being configured to be attached to a user's body part and to display just one test operation of the test plan at the time the one test operation needs to be performed.

13. A non-transitory computer readable medium including a computer program configured to perform and/or control the method of claim 1.

14. The apparatus of claim 12, wherein the receiving operation is performed in response to an activation signal.

15. The apparatus of claim 14, wherein, after the activation operation, a further boarding system value is generated and stored in the database.

16. The apparatus of claim 12, wherein at least one request signal is output that displays a test to be performed to a user on a display device to obtain the input signal.

17. The apparatus of claim 12, wherein the data signal is received via an interface to at least one door control unit of the boarding system.

18. The apparatus of claim 12, wherein the data signal is received by wire and/or wirelessly.

19. The apparatus of claim 12, wherein the reading-in reads in the input signal and wherein the test value has been input on an input device of a mobile tester.

20. The apparatus of claim 12, further comprising a non-volatile storage device for storing a full test log.

21. The apparatus of claim 12, wherein the reading-in reads in an image signal that represents an image of at least one portion of a driver's cab, and wherein a test log is generated using the image signal.

* * * * *